(12) United States Patent
Nataraj et al.

(10) Patent No.: US 12,229,686 B2
(45) Date of Patent: Feb. 18, 2025

(54) DETECTING DIGITAL HUMAN FACE IMAGE MANIPULATIONS

(71) Applicant: Mayachitra, Inc., Santa Barbara, CA (US)

(72) Inventors: Lakshmanan Nataraj, Chennai (IN); Tajuddin Manhar Mohammed, Goleta, CA (US); Tejaswi Nanjundaswamy, San Jose, CA (US); Michael Gene Goebel, Santa Barbara, CA (US); Bangalore S. Manjunath, Santa Barbara, CA (US); Shivkumar Chandrasekaran, Santa Barbara, CA (US)

(73) Assignee: Mayachitra, Inc., Santa Barbara, CA (US)

( * ) Notice: Subject to any disclaimer, the term of this patent is extended or adjusted under 35 U.S.C. 154(b) by 0 days.

(21) Appl. No.: 18/384,144

(22) Filed: Oct. 26, 2023

(65) Prior Publication Data

US 2024/0070467 A1 Feb. 29, 2024

Related U.S. Application Data

(63) Continuation of application No. 17/834,455, filed on Jun. 7, 2022, now Pat. No. 11,836,634, which is a (Continued)

(51) Int. Cl.
*G06N 3/088* (2023.01)
*G06F 18/21* (2023.01)
(Continued)

(52) U.S. Cl.
CPC ......... *G06N 3/088* (2013.01); *G06F 18/2148* (2023.01); *G06F 18/217* (2023.01);
(Continued)

(58) Field of Classification Search
CPC ...... G06N 3/088; G06N 3/045; G06V 10/454; G06V 10/82; G06V 10/764; G06F 18/2148; G06F 18/217
(Continued)

(56) References Cited

U.S. PATENT DOCUMENTS

| 11,429,812 B2 | 8/2022 | Nataraj et al. |
| 2008/0253626 A1 | 10/2008 | Shuckers et al. |

(Continued)

OTHER PUBLICATIONS

"U.S. Appl. No. 16/801,866, Examiner Interview Summary mailed Apr. 4, 2022", 2 pgs.
(Continued)

*Primary Examiner* — Michael R Neff
(74) *Attorney, Agent, or Firm* — Schwegman Lundberg & Woessner, P.A.

(57) ABSTRACT

Systems, devices, methods and instructions are described for detecting GAN generated images. On embodiment involves receiving an images, generating co-occurrence matrices on color channels of the image, generating analysis of the image by using a convolutional neural network trained to analyze image features of the images based on the generated co-occurrence matrices and determining whether the image is a GAN generated image based on the analysis.

18 Claims, 6 Drawing Sheets

Related U.S. Application Data continuation of application No. 16/801,866, filed on Feb. 26, 2020, now Pat. No. 11,429,812.

(60) Provisional application No. 62/956,999, filed on Jan. 3, 2020.

(51) Int. Cl.
*G06F 18/214* (2023.01)
*G06N 3/045* (2023.01)
*G06V 10/44* (2022.01)
*G06V 10/764* (2022.01)
*G06V 10/82* (2022.01)

(52) U.S. Cl.
CPC ........... *G06N 3/045* (2023.01); *G06V 10/454* (2022.01); *G06V 10/764* (2022.01); *G06V 10/82* (2022.01)

(58) Field of Classification Search
USPC ....................................................... 382/157
See application file for complete search history.

(56) References Cited

U.S. PATENT DOCUMENTS

| | | |
|---|---|---|
| 2009/0269022 A1 | 10/2009 | Li et al. |
| 2016/0335478 A1 | 11/2016 | Bredno et al. |
| 2018/0204048 A1 | 7/2018 | Chefd'hotel et al. |
| 2018/0235467 A1 | 8/2018 | Celenk et al. |
| 2019/0080205 A1 | 3/2019 | Kaufhold et al. |
| 2019/0197358 A1 | 6/2019 | Madani et al. |
| 2019/0251612 A1 | 8/2019 | Fang et al. |
| 2019/0347388 A1* | 11/2019 | Jiang ...................... G06V 10/82 |
| 2019/0354746 A1* | 11/2019 | Zhang .................. G06V 40/171 |
| 2020/0068214 A1* | 2/2020 | Saeedi ................... H04N 19/57 |
| 2020/0129061 A1 | 4/2020 | Goodsitt et al. |
| 2020/0134876 A1 | 4/2020 | Park et al. |
| 2020/0183035 A1 | 6/2020 | Liu et al. |
| 2021/0201003 A1* | 7/2021 | Banerjee ................ G06V 10/82 |
| 2021/0209415 A1 | 7/2021 | Nataraj et al. |
| 2022/0318569 A1 | 10/2022 | Nataraj et al. |

OTHER PUBLICATIONS

"U.S. Appl. No. 16/801,866, Final Office Action mailed Feb. 11, 2022", 17 pgs.

"U.S. Appl. No. 16/801,866, Non Final Office Action mailed Aug. 27, 2021", 16 pgs.

"U.S. Appl. No. 16/801,866, Notice of Allowance mailed Apr. 25, 2022", 7 pgs.

"U.S. Appl. No. 16/801,866, Response filed Apr. 6, 2022 to Final Office Action mailed Feb. 11, 2022", 10 pgs.

"U.S. Appl. No. 16/801,866, Response filed Nov. 23, 2021 to Non Final Office Action mailed Aug. 27, 2021", 10 pgs.

"U.S. Appl. No. 17/834,455, Non Final Office Action mailed Dec. 14, 2022", 13 pgs.

"U.S. Appl. No. 17/834,455, Notice of Allowance mailed Jul. 26, 2023", 9 pgs.

"U.S. Appl. No. 17/834,455, Response filed Jun. 14, 2023 to Non Final Office Action mailed Dec. 14, 2022", 9 pgs.

Nataraj, Lakshmanan, et al., "Detecting GAN generated Fake Images using Co-occurrence Matrices", (Mar. 15, 2019), 6 pgs.

* cited by examiner

DETECTING DIGITAL HUMAN FACE IMAGE MANIPULATIONS

PRIORITY

This present application is a continuation of U.S. patent application Ser. No. 17/834,455, filed on Jun. 7, 2022, which is a continuation of U.S. patent application Ser. No. 16/801,866, filed on Feb. 26, 2020, which claims the benefit of priority to U.S. Provisional Patent Application Ser. No. 62/956,999, filed on Jan. 3, 2020, the content of each being respectively incorporated by reference herein in its entirety.

This invention was made with Government support under Contract Number FA875016C0078 awarded by The Defense Advanced Research Projects Agency. The Government has certain rights in this invention.

TECHNICAL FIELD

Embodiments of the present disclosure relate generally to image detection. More particularly, but not by way of limitation, the present disclosure addresses systems and methods for detecting digital image manipulations, such as detecting fake images generated by generative adversarial networks (GAN) generated fake images.

BACKGROUND

Recent advances in machine learning and artificial intelligence have made it tremendously easy to create and synthesize digital manipulations in images and videos. Therefore, there is a need for robust systems and methods to identify such digital manipulations.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The present disclosure provides an approach for detecting generative adversarial network (GAN) generated fake images using a combination of co-occurrence matrices and deep learning.

Generally, GANs contain two networks—the first network is a generative network that can generate fake (e.g., digitally manipulated) images and the second network is a discriminative network that determines if an image is real or fake. As the discriminative network improves at distinguishing between real and fake images, the generative model improves at generating fake images.

GANs may be applied to many image processing tasks such as image synthesis, super-resolution and image completion. For example, GANs may be used for generating computer generated (CG) faces, augmenting faces with CG facial attributes and seamless transfer of texture between images. GAN-based techniques alter the statistics of pixels in the images that they generate. Conventional approaches in detecting GAN generated images have been studied in the field of steganalysis, which aims to detect the presence of hidden data in digital images.

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Various embodiments described herein improve the accuracy of identifying GAN generated fake images using a combination of pixel co-occurrence matrices and deep learning. In some example embodiments, co-occurrence matrices are computed on an input image and passed directly through a deep learning framework, thereby allowing the network to learn important features of the co-occurrence matrices. In some examples, the deep learning framework comprises a convolutional neural network trained to identify GAN generated fake images. Based on the analysis by the deep learning framework, the system may determine whether or not the input image is a digitally manipulated image.

Figure 1:
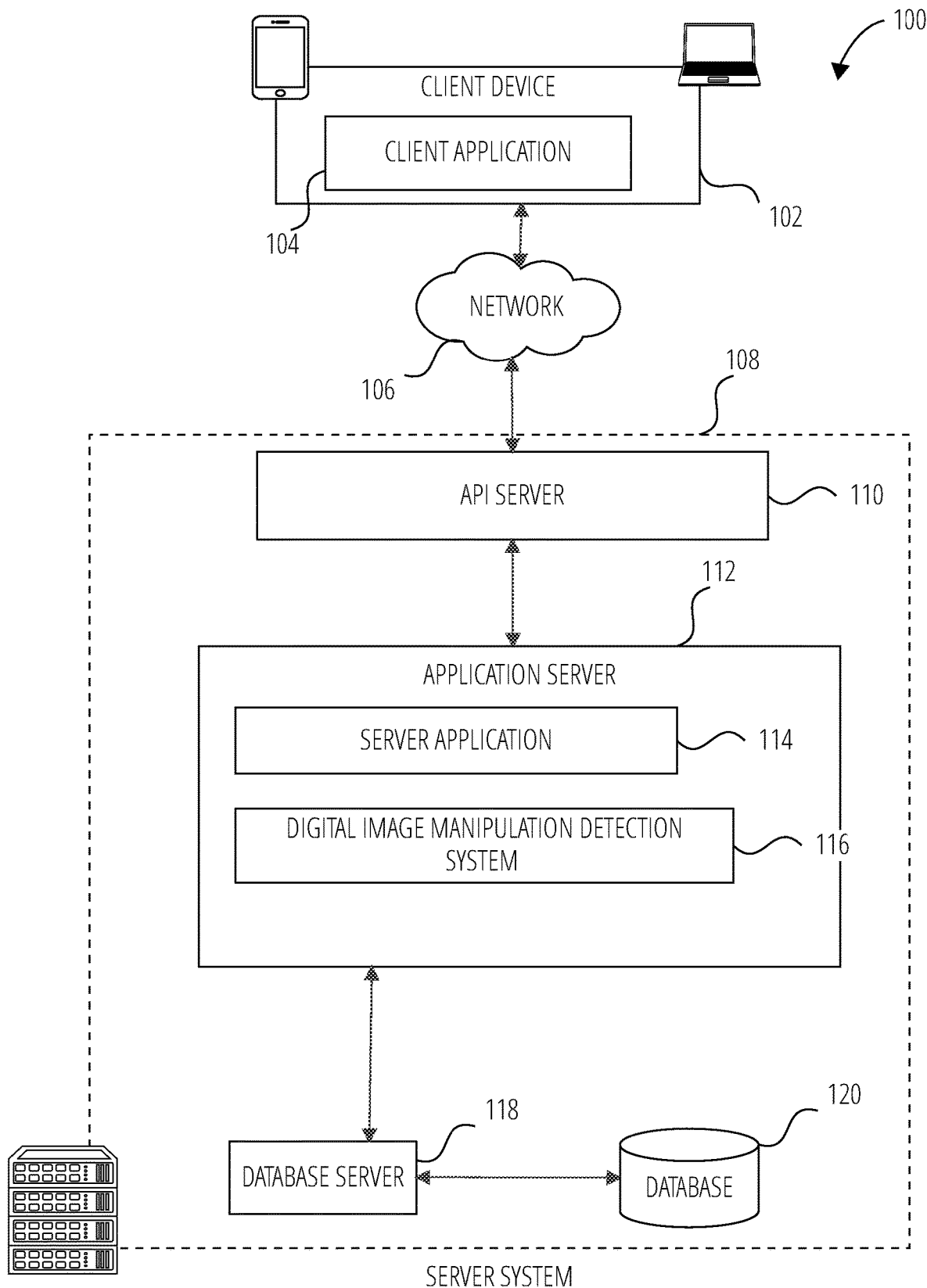
FIG. 1 is a diagrammatic representation of a networked environment in which the present disclosure may be deployed, in accordance with some example embodiments.

FIG. 1 is a block diagram showing an example system 100 for exchanging data (e.g., messages and associated content) over a network. The system 100 includes multiple instances of a client device 102, each of which hosts a number of applications including a client application 104. Each client application 104 is communicatively coupled to other instances of the client application 104 and a server system 108 via a network 106 (e.g., the Internet).

A client application 104 is able to communicate and exchange data with another client application 104 and with the server system 108 via the network 106. The data exchanged between client application 104, and between a client application 104 and the server system 108, includes functions (e.g., commands to invoke functions) as well as payload data (e.g., text, audio, video or other multimedia data).

The server system 108 provides server-side functionality via the network 106 to a particular client application 104. While certain functions of the system 100 are described herein as being performed by either a client application 104 or by the server system 108, the location of certain functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 supports various services and operations that are provided to the client application 104. Such operations include transmitting data to, receiving data from, and processing data generated by the client application 104. This data may include, message content, client device information, geolocation information, as examples. Data exchanges within the system 100 are invoked and controlled through functions available via user interfaces (UIs) of the client application 104.

Turning now specifically to the server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the client application 104 in order to invoke functionality of the application server 112. The Application Program Interface (API) server 110 exposes various functions supported by the application server 112.

The application server 112 hosts a number of applications and subsystems, including a server application 114, a digital image manipulation detection system 116.

The server application 114 implements a number of data processing technologies and functions. Other processor and memory intensive processing of data may also be performed server-side by the server application 114, in view of the hardware requirements for such processing.

The digital image manipulation detection system 116 supports various data processing services and makes these functions and services available to the server application 114. The digital image manipulation detection system 116 detects GAN generated fake images using a combination of co-occurrence matrices and deep learning. For example, the digital image manipulation detection system 116 may compute co-occurrence matrices on color channels of an image and then train the co-occurrence matrices using a deep convolutional neural network to distinguish GAN generated fake images from authentic (e.g., non-digitally manipulated images) images.

The application server 112 is communicatively coupled to a database server 118, which facilitates access to a database 120 in which is stored data associated with messages processed by the server application 114.

Figure 2:
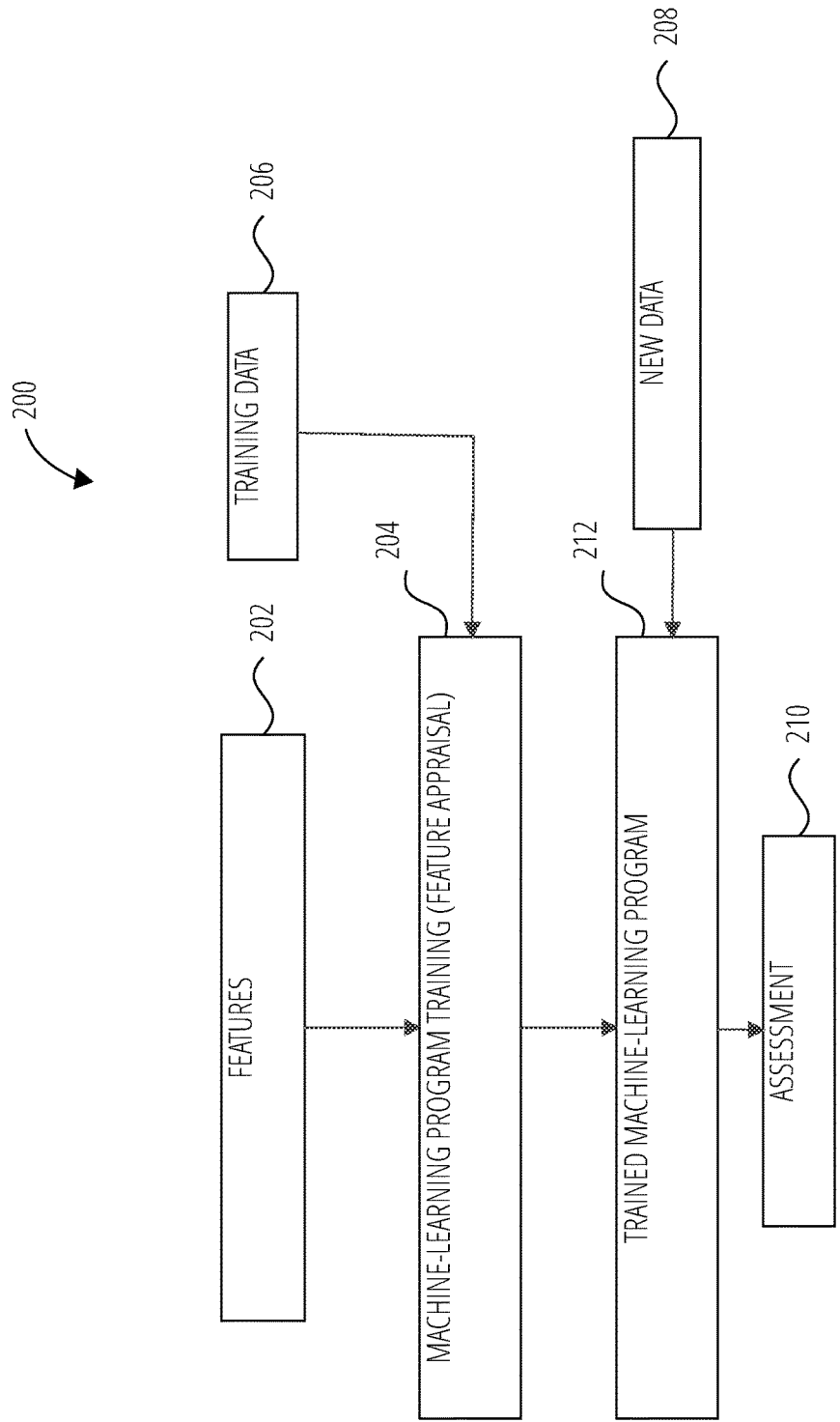
FIG. 2 is a block diagram illustrating an example machine upon or by which one or more example process embodiments described herein may be implemented or controlled.

FIG. 2 illustrates the training and use of a machine-learning program 200, according to some example embodiments. In some example embodiments, machine-learning programs (MLPs), also referred to as machine-learning algorithms or tools, are utilized to perform operations associated with malware classification.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 206 in order to make data-driven predictions or decisions expressed as outputs or assessment 210. Although example embodiments are presented with respect to a few machine-learning tools, the principles presented herein may be applied to other machine-learning tools.

In some example embodiments, different machine learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide a prediction probability to classify an image as digitally manipulated or not. The machine-learning algorithms utilize the training data 206 to find correlations among identified features 202 that affect the outcome.

The machine-learning algorithms utilize features 202 for analyzing the data to generate an assessment 210. The features 202 are an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs. In one example embodiment, the features 202 may be of different types. For example, the features 202 may be features of the co-occurrence matrices.

The machine-learning algorithms utilize the training data 206 to find correlations among the identified features 202 that affect the outcome or assessment 210. In some example embodiments, the training data 206 includes labeled data, which is known data for one or more identified features 202 and one or more outcomes, such as detecting digitally manipulated images.

With the training data 206 and the identified features 202, the machine learning tool is trained at machine-learning program training 204. The machine-learning tool appraises the value of the features 202 as they correlate to the training data 206. The result of the training is the trained machine-learning program 212.

When the trained machine-learning program 212 is used to perform an assessment, new data 208 is provided as an input to the trained machine-learning program 212, and the machine-learning program 212 generates the assessment 210 as output. For example, when an image is received and co-occurrence matrices are computed on color channels of the image, the machine-learning program utilizes features of the co-occurrence matrices to determine if the image is digitally manipulated or not. Further details regarding the trained machine-learning program 212 are described below in relation to FIG. 3.

Figure 3:
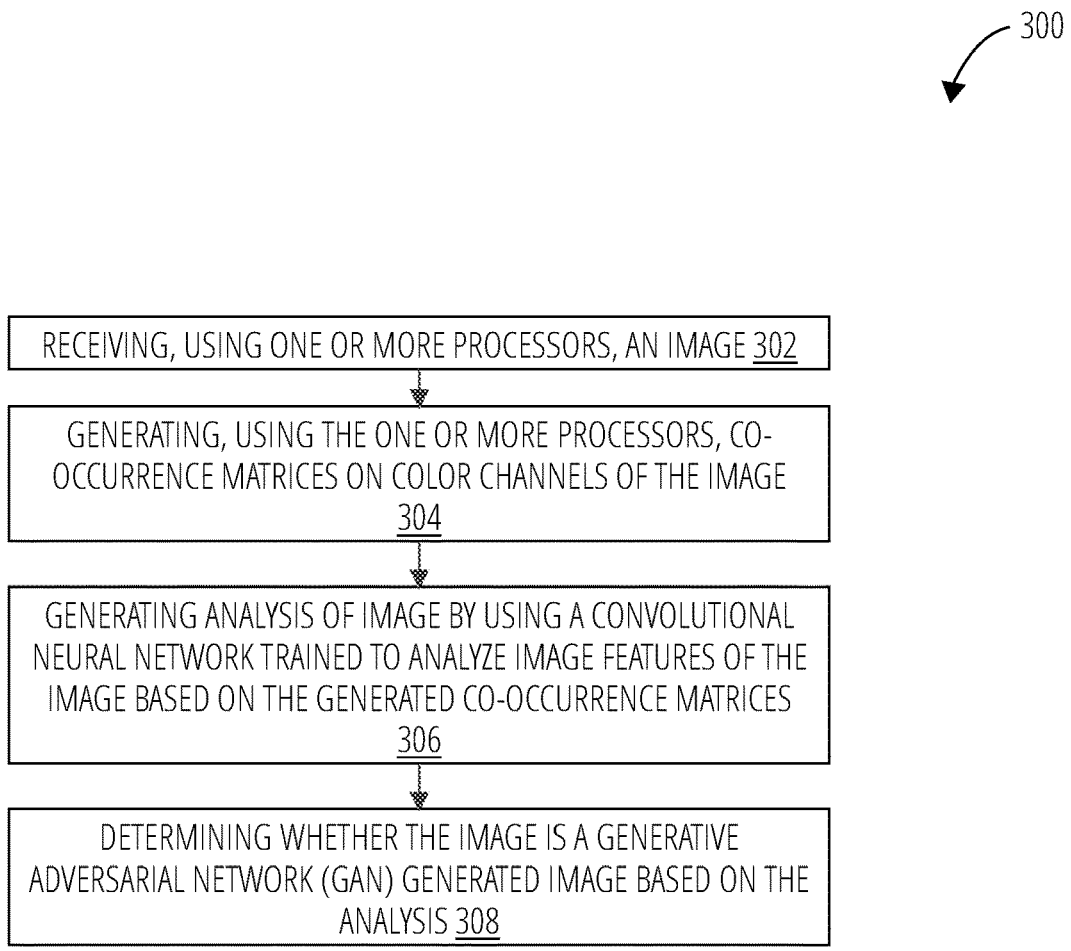
FIG. 3 is a flowchart illustrating an example method for detecting digitally manipulated images according to some example embodiments.

FIG. 3 is an example method for detecting digitally manipulated images according to some example embodiments. In some embodiments, the method 300 is performed by a computer system with one or more processors. In some embodiments, the method 300 is embodied in computer-readable instructions stored in a non-transitory storage device, such that when the instructions are executed by one or more processors of a device, the device performs the method 300. Other embodiments may be implemented using any acceptable format or instantiation.

Method 300 begins with operation 302, receiving, using one or more processors, an image. In some examples the image is accessed by a computer device (e.g., client device 102) from one or more databases (e.g., database 120).

In operation 304, the digital image manipulation detection system 116 generates, using the one or more processors, co-occurrence matrices on color channels of the image. As used herein, a co-occurrence matrix can comprise a matrix that is defined over an image to be the distribution of co-occurring pixel values (e.g., color values, grayscale values) at a given offset. The offset can comprise a position operator that can be applied to any pixel in the image. In some examples, the co-occurrence matrices are computed directly on the image pixels of each of the color channels of the image (e.g., red, blue and green channels).

In operation 306, the digital image manipulation detection system 116 generates analysis of the image by using a convolutional neural network trained to analyze image features of the image based on the generated co-occurrence matrices. In some examples, the neural network is a convolutional neural network trained to identify GAN generated images. In some embodiments the convolutional neural network is a multi-layer deep convolutional network. For example, a neural network having more than one hidden layer may be referred to as a deep neural network (e.g., a deep neural network may have 5, 10, 100 or 1000 hidden layers).

In one example, the convolutional neural network is trained on a dataset comprising unpaired image-to-image translations of various objects and scenes, and style transfers such as labels to facades that were generated using a cycle-consistent GAN framework (e.g., image framework encourages cycle consistency by adding additional loss to measure the difference between the generated output of the second generator and the original image, and the reverse).

In another example, the convolutional neural network is trained on a dataset including authentic images and GAN generated images. For example, the dataset may include original, authentic human face images and GAN generated images with varying facial attributes of the original, authentic human face images such as altering the original image with black hair, blond hair, brown hair, gender, age or combinations of the alterations. In some examples, the convolutional neural network is trained on JPEG compressed images. It is understood that the convolutional neural network may be trained on any suitable GAN dataset(s).

Figure 4:
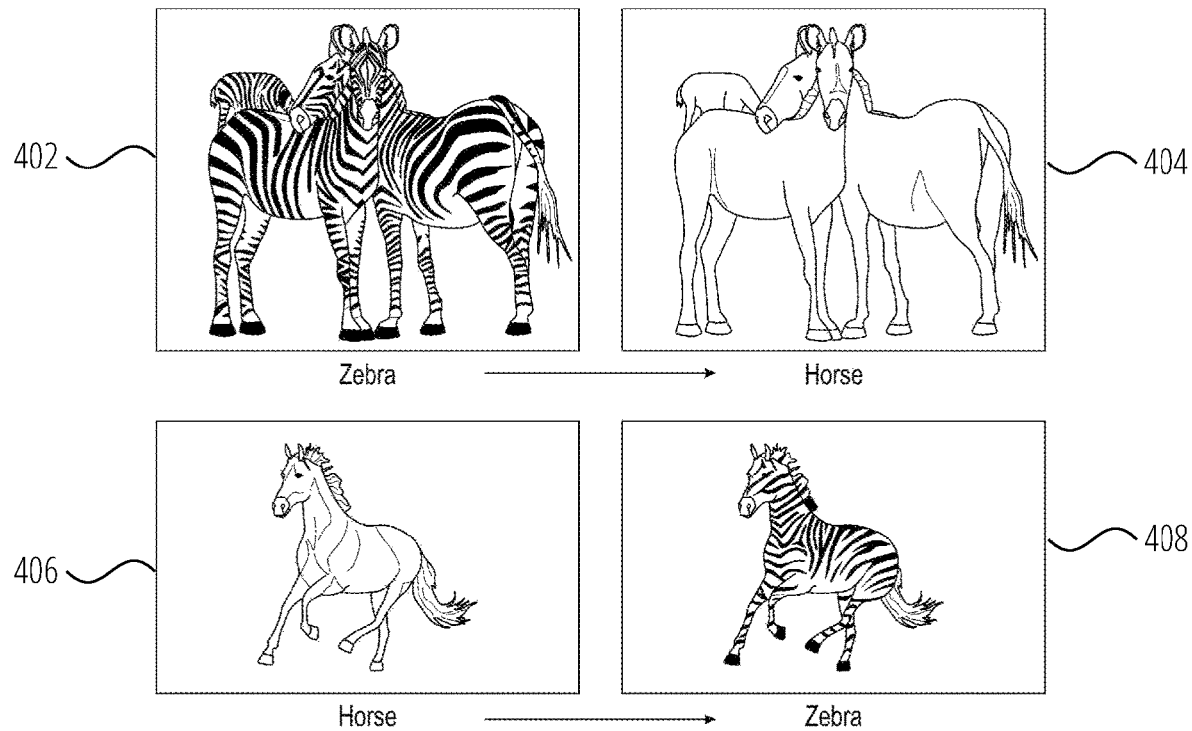
FIG. 4 is an illustration of example GAN-generated texture translation between images, according to some example embodiments.

In operation 308, the digital image manipulation detection system 116 determines whether the image is a GAN generated image based on the analysis. For example, the digital image manipulation detection system 116 determines whether the image is a GAN generated image or is an authentic image. In some examples, upon determining whether the image is a GAN generated image or is an authentic image, the digital image manipulation detection system 116 may transmit a notification or trigger to the computer device with the determination. In some examples, the determination is stored in association with the image. For example, the determination may be stored in metadata associated with the image FIG. 4 is an illustration of example GAN generated texture translation between images. In some examples image 402 is an authentic image of two zebras. Image 404 is a corresponding GAN manipulated image. In one example, image 402 may be an input image to the digital image manipulation detection system 116. The digital image manipulation detection system 116 may therefore determine that the image 402 is authentic and is thus not a digitally manipulated image. In another example, image 404 may be an input image to the digital image manipulation detection system 116. The digital image manipulation detection system 116 may therefore determine that the image 404 is a GAN generated fake image.

In another example, image 406 is an authentic image of a horse and image 408 is the corresponding GAN manipulated image. The digital image manipulation detection system 116 may thus determine that image 406 is authentic (e.g., not digitally manipulated). The digital image manipulation detection system 116 may determine that image 406 is a GAN generated fake images. In some examples, the digital image manipulation detection system 116 may identify the pixels within image 406 which are digitally manipulated.

Figure 5:
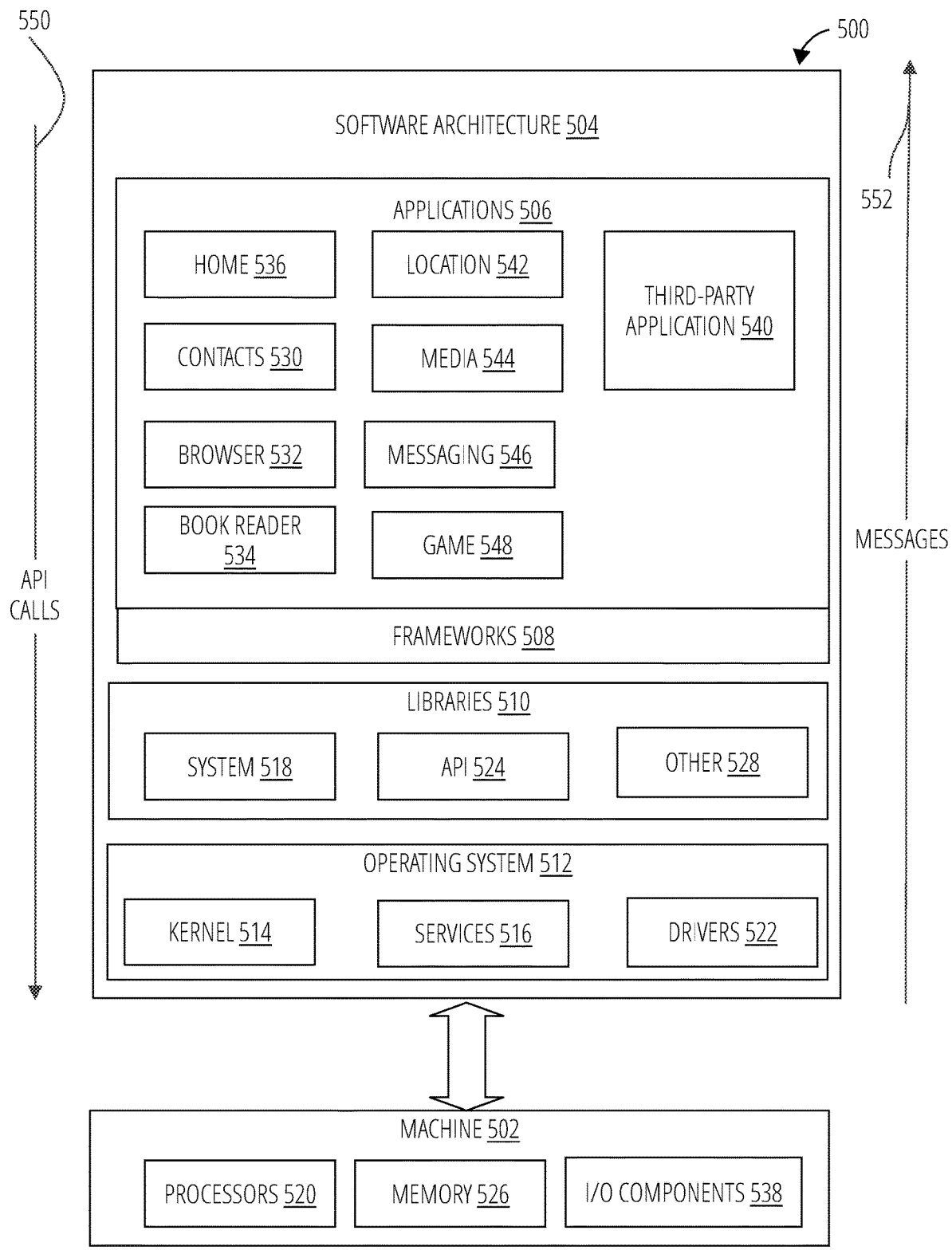
FIG. 5 is a block diagram illustrating an example software architecture within which the present disclosure may be implemented, in accordance with example embodiments.

FIG. 5 is a block diagram 500 illustrating a software architecture 504, which can be installed on any one or more of the devices described herein. The software architecture 504 is supported by hardware such as a machine 502 that includes processors 520, memory 526, and I/O components 538. In this example, the software architecture 504 can be conceptualized as a stack of layers, where each layer provides a particular functionality. The software architecture 504 includes layers such as an operating system 512, libraries 510, frameworks 508, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionality. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 510 provide a low-level common infrastructure used by the applications 506. The libraries 510 can include system libraries 518 (e.g., C standard library) that provide functions such as memory allocation functions, string manipulation functions, mathematic functions, and the like. In addition, the libraries 510 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 510 can also include a wide variety of other libraries 528 to provide many other APIs to the applications 506.

The frameworks 508 provide a high-level common infrastructure that is used by the applications 506. For example, the frameworks 508 provide various graphical user interface (GUI) functions, high-level resource management, and high-level location services. The frameworks 508 can provide a broad spectrum of other APIs that can be used by the applications 506, some of which may be specific to a particular operating system or platform.

In an example embodiment, the applications 506 may include a home application 536, a contacts application 530, a browser application 532, a book reader application 534, a location application 542, a media application 544, a messaging application 546, a game application 548, and a broad assortment of other applications such as a third-party application 540. The e applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party application 540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 540 can invoke the API calls 550 provided by the operating system 512 to facilitate functionality described herein.

Figure 6:
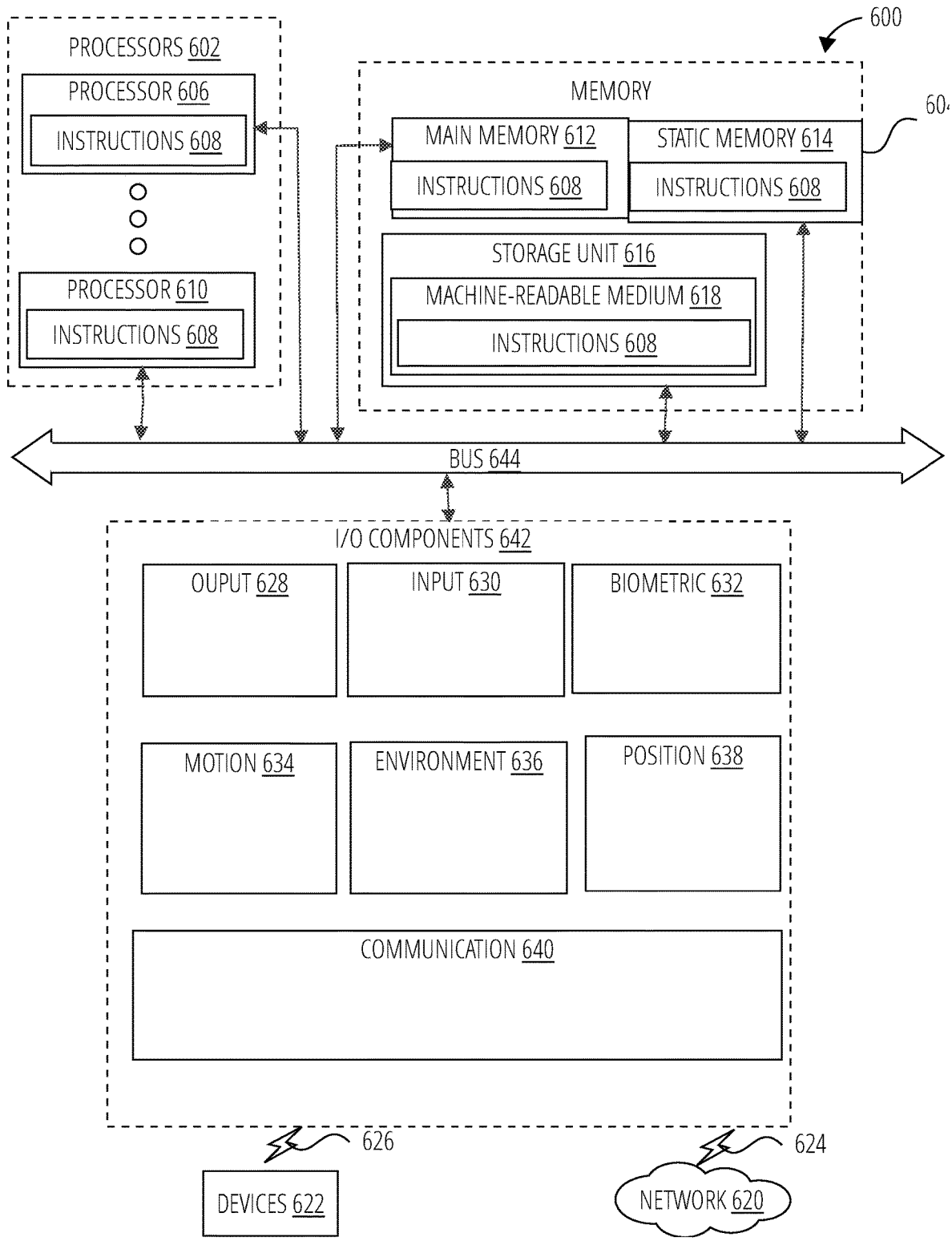
FIG. 6 is a diagrammatic representation of an example machine in the form of a computer system within which a set of instructions may be executed for causing the machine to perform any one or more of the methodologies discussed herein, in accordance with some example embodiments.

FIG. 6 is a diagrammatic representation of the computer system 600 within which instructions 608 (e.g., software, a program, an application, an applet, an app, or other executable code) for causing the computer system 600 to perform any one or more of the methodologies discussed herein may be executed. For example, the instructions 608 may cause the computer system 600 to execute any one or more of the methods described herein. The instructions 608 transform the general, non-programmed computer system 600 into a particular computer system 600 programmed to carry out the described and illustrated functions in the manner described. The computer system 600 may operate as a standalone device or may be coupled (e.g., networked) to other machines. In a networked deployment, the computer system 600 may operate in the capacity of a server machine or a client machine in a server-client network environment, or as a peer machine in a peer-to-peer (or distributed) network environment. The computer system 600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 608, sequentially or otherwise, that specify actions to be taken by the computer system 600. Further, while only a single computer system 600 is illustrated, the term "machine" shall also be taken to include a collection of machines that individually or jointly execute the instructions 608 to perform any one or more of the methodologies discussed herein.

The computer system 600 may include processors 602, memory 604, and I/O components 642, which may be configured to communicate with each other via a bus 644. In an example embodiment, the processors 602 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 606 and a processor 610 that execute the instructions 608. The term "processor" is intended to include multi-core processors that may comprise two or more independent processors (sometimes referred to as "cores") that may execute instructions contemporaneously. Although FIG. 6 shows multiple processors 602, the computer system 600 may include a single processor with a single core, a single processor with multiple cores (e.g., a multi-core processor), multiple processors with a single core, multiple processors with multiples cores, or any combination thereof.

The memory 604 includes a main memory 612, a static memory 614, and a storage unit 616, both accessible to the processors 602 via the bus 644. The main memory 604, the static memory 614, and storage unit 616 store the instructions 608 embodying any one or more of the methodologies or functions described herein. The instructions 608 may also reside, completely or partially, within the main memory 612, within the static memory 614, within machine-readable medium 618 within the storage unit 616, within at least one of the processors 602 (e.g., within the processor's cache memory), or any suitable combination thereof, during execution thereof by the computer system 600.

The I/O components 642 may include a wide variety of components to receive input, provide output, produce output, transmit information, exchange information, capture measurements, and so on. The specific I/O components 642 that are included in a particular machine will depend on the type of machine. For example, portable machines such as mobile phones may include a touch input device or other such input mechanisms, while a headless server machine will likely not include such a touch input device. It will be appreciated that the I/O components 642 may include many other components that are not shown in FIG. 6. In various example embodiments, the I/O components 642 may include output components 628 and input components 630. The output components 628 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 630 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 642 may include biometric components 632, motion components 634, environmental components 636, or position components 638, among a wide array of other components. For example, the biometric components 632 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 634 include acceleration sensor components (e.g., accelerometer), gravitation sensor components, rotation sensor components (e.g., gyroscope), and so forth. The environmental components 636 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 638 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 642 further include communication components 640 operable to couple the computer system 600 to a network 620 or devices 622 via a coupling 624 and a coupling 626, respectively. For example, the communication components 640 may include a network interface component or another suitable device to interface with the network 620. In further examples, the communication components 640 may include wired communication components, wireless communication components, cellular communication components, Near Field Communication (NFC) components, Bluetooth© components (e.g., Bluetooth® Low Energy), Wi-Fi© components, and other communication components to provide communication via other modalities. The devices 622 may be another machine or any of a wide variety of peripheral devices (e.g., a peripheral device coupled via a USB).

Moreover, the communication components 640 may detect identifiers or include components operable to detect identifiers. For example, the communication components 640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640, such as location via Internet Protocol (IP) geolocation, location via Wi-Fi® signal triangulation, location via detecting an NFC beacon signal that may indicate a particular location, and so forth.

The various memories (e.g., memory 604, main memory 612, static memory 614, and/or memory of the processors 602) and/or storage unit 616 may store one or more sets of instructions and data structures (e.g., software) embodying or used by any one or more of the methodologies or functions described herein. These instructions (e.g., the instructions 608), when executed by processors 602, cause various operations to implement the disclosed embodiments.

The instructions 608 may be transmitted or received over the network 620, using a transmission medium, via a network interface device (e.g., a network interface component included in the communication components 640) and using any one of a number of well-known transfer protocols (e.g., hypertext transfer protocol (HTTP)). Similarly, the instructions 608 may be transmitted or received using a transmission medium via the coupling 626 (e.g., a peer-to-peer coupling) to the devices 622.

What is claimed is:

1. A method, comprising:
   accessing, using one or more processors, an image;
   training, using the one or more processors, a convolutional neural network using a set of authentic human face images and a set of digitally manipulated human face images;
   generating co-occurrence matrices on pixel values of the image, the generating comprises;
      applying a position operator to pixels in the image to determine a defined offsets; and
      defining a co-occurrence matrix over the image representing distributions of co-occurring pixel values at the defined offsets;
   analyzing the image based on the generated co-occurrence matrices using the trained convolutional neural network, the trained convolutional network trained to detect images generated by a generative adversarial network (GAN); and
   classifying the image based on the analysis.

2. The method of claim 1, wherein the classifying of the image further comprises:
   identifying a plurality of pixels within the image that are digitally manipulated by the GAN.

3. The method of claim 2, wherein the plurality of pixels represents a human face.

4. The method of claim 1, wherein the set of authentic human face images and the set of digitally manipulated human face images comprise pairs of an original human face image and a corresponding digitally manipulated human face image with at least one varying facial attribute altered by the GAN.

5. The method of claim 1, wherein the defining of the co-occurrence matrix comprises:
   populating the co-occurrence matrices based on co-occurring pixel values at the defined pixel offsets within the image; and
   using the populated co-occurrence matrices as inputs to the convolutional neural network.

6. The method of claim 5, wherein the pixel values comprise grayscale values.

7. The method of claim 1, wherein the set of authentic human face images and the set of digitally manipulated human face images are joint photographic experts group (JPEG) compressed images.

8. The method of claim 1, wherein the co-occurrence matrices are generated on pixel values of color channels comprising a red channel, a green channel, and a blue channel.

9. A system comprising:
   one or more processors; and
   a non-transitory memory storing instructions that, when executed by the one or more processors, configure the system to;
      accessing an image;

training a convolutional neural network using a set of authentic human face images and a set of digitally manipulated human face images;

generating co-occurrence matrices on pixel values of the image, the generating comprises:

applying a position operator to pixels in the image to determine a defined offsets; and defining a co-occurrence matrix over the image representing distributions of co-occurring pixel values at the defined offsets;

analyzing the image based on the generated co-occurrence matrices using the trained convolutional neural network, the trained convolutional network trained to detect images generated by a generative adversarial network (GAN); and classifying the image based on the analysis.

10. The system of claim 9, wherein classifying the image further comprises:

identifying a plurality of pixels within the image that are digitally manipulated by the GAN.

11. The system of claim 10, wherein the plurality of pixels represents a human face.

12. The system of claim 9, wherein the set of authentic human face images and the set of digitally manipulated human face images comprise pairs of an original human face image and a corresponding digitally manipulated human face image with at least one varying facial attribute altered by the GAN.

13. The system of claim 9, wherein the defining of the co-occurrence matrix comprises:

populating the co-occurrence matrices based on co-occurring pixel values at the defined pixel offsets within the image; and using the populated co-occurrence matrices as inputs to the convolutional neural network.

14. The system of claim 13, wherein the pixel values comprise grayscale values.

15. The system of claim 9, wherein the set of authentic human face images and the set of digitally manipulated human face images are joint photographic experts group (JPEG) compressed images.

16. The system of claim 9, wherein the co-occurrence matrices are generated on pixel values of color channels comprising a red channel, a green channel, and a blue channel.

17. A non-transitory computer-readable storage medium, the computer-readable storage medium including instructions that when executed by a computer, cause the computer to perform operations comprising:

accessing an image;

training a convolutional neural network using a set of authentic human face images and a set of digitally manipulated human face images;

generating co-occurrence matrices on pixel values of the image, the generating comprises:

applying a position operator to pixels in the image to determine a defined offsets; and defining a co-occurrence matrix over the image representing distributions of co-occurring pixel values at the defined offsets;

analyzing the image based on the generated co-occurrence matrices using the trained convolutional neural network, the trained convolutional network trained to detect images generated by a generative adversarial network (GAN); and classifying the image based on the analysis.

18. The computer-readable storage medium of claim 17, wherein classifying the image further comprises:

identifying a plurality of pixels within the image that are digitally manipulated by the GAN.

* * * * *